US012641440B2

(12) United States Patent
Yan et al.

(10) Patent No.: US 12,641,440 B2
(45) Date of Patent: May 26, 2026

(54) RESOLUTION METHOD INTENT-BASED NETWORK RESOURCE CONFLICTS AND APPARATUS THEREOF

(71) Applicant: BEIJING UNIVERSITY OF POSTS AND TELECOMMUNICATIONS, Beijing (CN)

(72) Inventors: Shi Yan, Beijing (CN); Shenhu Zhang, Beijing (CN); Xiqing Liu, Beijing (CN); Bin Cao, Beijing (CN); Mugen Peng, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 362 days.

(21) Appl. No.: 18/407,288

(22) Filed: Jan. 8, 2024

(65) Prior Publication Data

US 2024/0155356 A1 May 9, 2024

Related U.S. Application Data

(63) Continuation of application No. PCT/CN2023/094925, filed on May 18, 2023.

(30) Foreign Application Priority Data

May 20, 2022 (CN) ......................... 202210553721.X

(51) Int. Cl.
| | |
|---|---|
| *H04W 16/10* | (2009.01) |
| *H04B 17/26* | (2015.01) |
| *H04B 17/29* | (2015.01) |

(52) U.S. Cl.
CPC ............ *H04W 16/10* (2013.01); *H04B 17/26* (2015.01); *H04B 17/29* (2015.01)

(58) Field of Classification Search
CPC ........ H04B 17/26; H04B 17/29; H04W 16/10
See application file for complete search history.

(56) References Cited

U.S. PATENT DOCUMENTS

| | | | | |
|---|---|---|---|---|
| 9,472,196 B1* | 10/2016 | Wang | ...................... | G06F 3/167 |
| 10,554,817 B1* | 2/2020 | Sullivan | .............. | H04M 7/0036 |
| 2016/0196820 A1* | 7/2016 | Williams | ............ | G10L 15/1822 |
| | | | | 704/244 |
| 2020/0274772 A1* | 8/2020 | A | ........................... | H04W 88/12 |
| 2021/0125025 A1* | 4/2021 | Kuo | ....................... | G06N 20/00 |
| 2021/0217406 A1* | 7/2021 | Jang | ........................ | G10L 15/18 |
| 2022/0138014 A1* | 5/2022 | Maturi | ............... | G06F 9/44505 |
| | | | | 709/226 |

(Continued)

*Primary Examiner* — Syed Ali

(57) ABSTRACT

Disclosed are a resolution method for intent-based wireless network resource conflicts and an apparatus thereof. The method includes the following steps: periodically acquiring configured resource information about a current wireless network; pre-allocating resources required for a newly-added intent; and determining whether a pre-allocated resource configuration policy is incompatible with a resource configuration policy being executed in a current network. The apparatus includes: an interface module; a solution module; a feedback module; and a storage module. Through the relative priority of intent requirements, a bias of an implementation satisfaction degree of a network configuration policy is determined, and network resource conflicts of intent requirements with different priorities are solved.

7 Claims, 6 Drawing Sheets

(56)                    References Cited

U.S. PATENT DOCUMENTS

2024/0214272 A1*   6/2024  Ying  ................... H04L 41/0873
2025/0190794 A1*   6/2025  Bahdanau  ................ G06N 3/08
2025/0267071 A1*   8/2025  Baktir  .................... H04L 43/16

* cited by examiner

No correlation          Inclusion          Partial correlation

No correlation

Lifecycle

Lifecycle

Inclusion

Lifecycle

Lifecycle

Partial correlation

Lifecycle

Lifecycle

FIG. 4

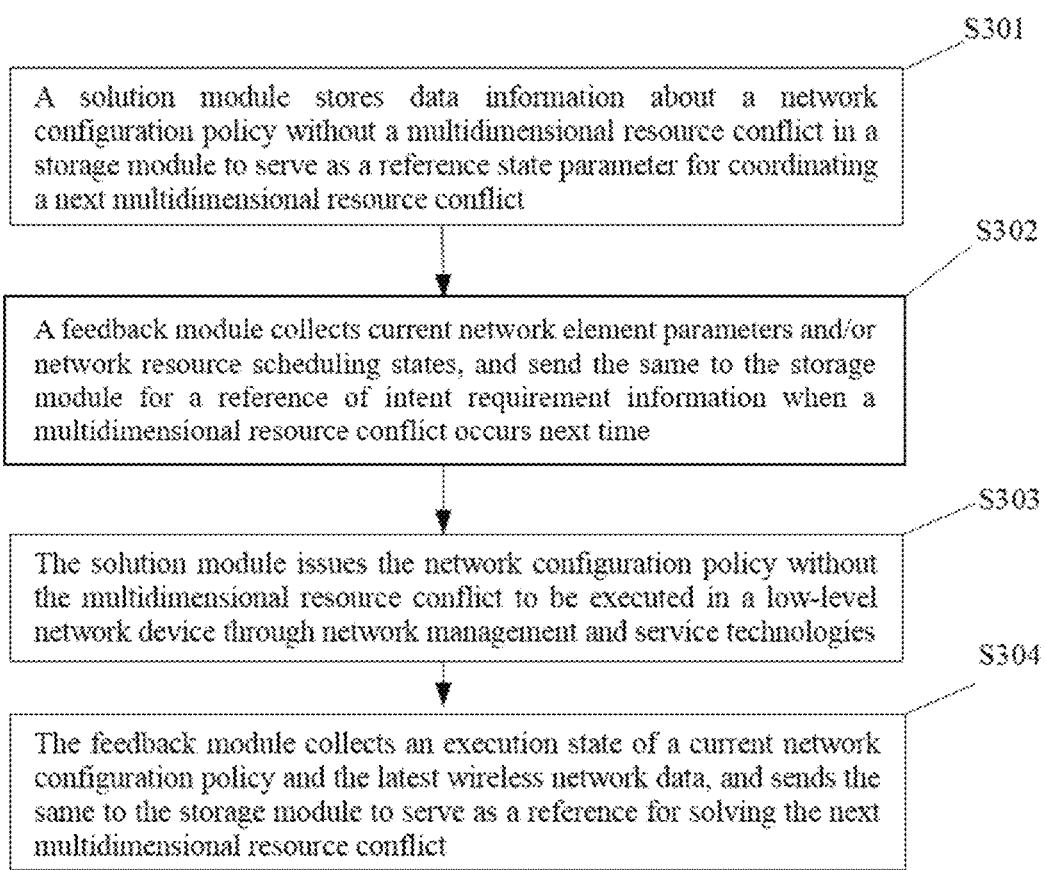

S301

A solution module stores data information about a network configuration policy without a multidimensional resource conflict in a storage module to serve as a reference state parameter for coordinating a next multidimensional resource conflict

S302

A feedback module collects current network element parameters and/or network resource scheduling states, and send the same to the storage module for a reference of intent requirement information when a multidimensional resource conflict occurs next time

S303

The solution module issues the network configuration policy without the multidimensional resource conflict to be executed in a low-level network device through network management and service technologies

S304

The feedback module collects an execution state of a current network configuration policy and the latest wireless network data, and sends the same to the storage module to serve as a reference for solving the next multidimensional resource conflict

FIG. 6

Interface module

Solution module

Storage module

Feedback module

FIG. 7

RESOLUTION METHOD INTENT-BASED NETWORK RESOURCE CONFLICTS AND APPARATUS THEREOF

CROSS-REFERENCE TO RELATED APPLICATIONS

This application is a continuation of PCT/CN2023/094925, filed May 18, 2023 and claims priority of Chinese Patent Application No. 202210553721. X, filed on May 20, 2022, the entire contents of which are incorporated herein by reference.

TECHNICAL FIELD

The present application relates to the technical field of wireless communications, in particular to a resolution method for intent-based wireless network resource conflicts and an apparatus thereof.

BACKGROUND

In recent years, with the research and development of software defined network (SDN), network functions virtualization (NFV) and the requirements of network operators for network automation, intelligence and simplification, intent-based networks (IBN) came into being. The IBN can translate the objectives required for the network into the configuration policy of the network, and automatically complete the implementation and maintenance to ensure the realization of the intent requirements. Through the IBN, the efficiency of network management and operation is greatly improved, and the cost of network maintenance is reduced. The concept of the IBN is applied to radio access networks (RANs), i.e. intent-based radio access networks (IB-RANs), which can construct a digital twinning world between the physical network and the intelligent service intent, so that the RAN can adapt to the growing network scale and the changing diverse intent requirements.

However, different intents are implemented in the IB-RANs, resulting in the allocation and scheduling of resource data across different dimensions in the wireless network. Due to the high dynamic characteristics of the environment, the prior information of the network scheduling resources in the wireless network is missing, resulting in conflicts between the wireless network resource configuration policies in the intent priority, the scope of network operation and the parameters of the operating network elements, thereby causing the degradation of network performance.

At present, the typical approach to resolving resource conflicts in RANs usually focuses only on communication performances, which is achieved through the allocation of network virtualized communication resources and coordinated management of physical resources. However, there is currently no solution specifically addressing the multi-dimensional resource conflicts, such as communication and computation resources, in IB-RANs. To address this, there is a pressing need for a resolution method for intent-based wireless network resource conflicts, aiming to resolve the issues of conflicting requirements among multi-dimensional, such as communication and computation resources in intent-based wireless networks, and coincidentally, aiming to advance the deployment and operation of multi-dimensional resource-driven intent-based networks in the field of RANs. Based on the above problems existing in the prior art, the present application provides a resolution method for intent-based wireless network resource conflicts and an apparatus thereof.

SUMMARY

The present application provides a resolution method for intent-based wireless network resource conflicts and an apparatus thereof. The present application adopts the following technical solutions.

In a first aspect of the present application, the present application provides a resolution method for intent-based wireless network resource conflicts, including the following steps:

step 1: periodically acquiring configured resource information about a current wireless network and an intent performance state in the current network;

step 2: pre-allocating resources required for a newly-added intent when the newly-added intent occurs in the wireless network, and generating a pre-allocation resource configuration policy, determining whether the pre-allocation resource configuration policy is incompatible with a resource configuration policy being executed in the current network according to the configured resource information about the wireless network and the intent performance state in the current network, resource conflicts existing in the wireless network resource configuration policy if the pre-allocation resource configuration policy is incompatible with the resource configuration policy being executed in the current network, and redeploying network resources according to stored historical intent requirement information and the distribution of resources in the wireless network; and step 3: issuing a resource pre-allocation policy to be executed in a RAN if a current allocation resource configuration policy is compatible with the resource configuration policy being executed in the current network, and collecting and storing an execution state of a current wireless network resource configuration policy and latest intent performance state data.

Further, in step 2, an acted network area range and an executed lifecycle by a pre-allocation policy of the newly-added intent are compared with corresponding data information of a network configuration policy being executed in a network, and if an overlapped acted network area range and/or an overlapped executed time period do not exist, the pre-allocation policy of the newly-added intent is issued to be executed in a low-level network infrastructure through network management and service technologies, and otherwise, a satisfaction degree of a user in the network after executing a pre-allocation configuration policy is predicted using a satisfaction degree function by combining the pre-allocation configuration policy of the newly-added intent with parameter values and wireless network state information required for the network configuration policy being executed in the network, the intent referring to a desired state or effect of RANs, one intent being capable of serving one or more users, and a current intent referring to an intent to implement execution in the RAN.

Further, in step 1, the number of original intents in the wireless network is $\mathcal{N}$, and an expression of a preset intent satisfaction degree function is as follows:

$$SR(H_n(t)) = \frac{H_n(t) - H_{n,worst}}{H_{n,best} - H_{n,worst}}, \tag{1}$$

$H_n(t)$ representing a multidimensional performance of a certain intent n at a time t, and $H_{n,best}$ and $H_{n,worst}$ representing best and worst multidimensional performance function values of the certain intent n; an expression of the multidimensional performance is as follows:

$$H_n(t) = F_n\left[r_{V_{s,n}}(t), R_s(\cdot), a_s^n\right], \tag{2}$$

$F_n[\bullet]$ representing a multidimensional performance function of a certain intent n, $V_s$ representing a corresponding multidimensional network resource available for deployment for a performance metric s, including multidimensional resources such as communication and computation resources, illustratively, if the performance metric s referring to the computation time delay of a cloud service, then $V_s$ being represented as a CPU clock resource of the cloud server which affects the computation time delay, $r_{V_{s,n}}(t)$ representing a corresponding network resource vector allocated to the intent n for the performance metric s, $R_s(\bullet)$ representing a specific performance numerical function corresponding to the performance metric s, illustratively, a communication performance numerical function of a rate and a time delay being obtained according to a Shannon formula;

$$a_s^n$$

representing a preset weight of the intent n to the performance metric s, the greater the weight, the higher the importance of the performance metric s to the intent n, an expression of the multidimensional performance function $F_n[\bullet]$ of the intent n is as follows:

$$F_n\left[r_{V_{s,n}}(t), R_s(\cdot), a_s^n\right] = \frac{\sum_{u \subset U_n}\left[\frac{a_1^n R_1\left(r_{V_1,u}(t)\right)}{R_1^{max}} + \frac{a_2^n R_2\left(r_{V_2,u}(t)\right)}{R_2^{max}} +, \ldots, + \frac{a_s^n R_s\left(r_{V_s,u}(t)\right)}{R_s^{max}}\right]}{s \cdot U_n}, \tag{3}$$

$U_n$ representing a set of user equipment u belonging to the intent n in the wireless network, $$a_1^n, a_2^n, \ldots, a_s^n$$

representing a preset weight of the intent n to a performance metric s, $r_{V_{s,u}}(t)$ representing a corresponding network resource vector allocated to the intent n for the performance metric s, and $$R_1^{max}, R_2^{max}, \ldots, R_s^{max}$$

representing a maximum theoretical performance value of the performance metric s in the wireless network, the higher the value of $R_s(\bullet)$, the lower the performance metric s, corresponding $R_s(\bullet)$ and $$R_s^{max}$$

in the formula taking reciprocal forms.

Further, the step 2 specifically includes the following steps:

S201: comparing the acted network area range and the executed lifecycle by the pre-allocation policy required for the newly-added intent with the corresponding data information of the network configuration policy being executed in the network, and determining whether the overlapped acted network area range and/or the overlapped executed time period occur, step S202 being executed if so and step 3 being executed if not;

S202: determining whether the pre-allocation policy of the newly-added intent will result in an intent satisfaction degree in the network being equal to/lower than a satisfaction degree threshold value, step 203 being executed if so and step 3 being executed of not;

S203: canceling a pre-allocation policy estimated to cause multidimensional resource conflicts, and redeploying the network resources according to the stored historical intent requirement information and the distribution of resources in the wireless network;

S2041: establishing a multi-intent Stackelberg game model to perform intent-level coarse-grained network resource deployment according to an intent priority difference and a behavior of network resource competition in the wireless network;

S2042: dynamically adjusting network resources allocated to each user under the intent according to a bias difference of the user to different performance metrics under the intent, and performing user-level fine-grained network resource deployment; and S2043: determining whether a redeployment policy of the network resources results in the intent satisfaction degree in the network being equal to/lower than the satisfaction degree threshold value, step S2041 being executed if not and step 3 being executed if so.

Further, the redeployment of wireless network resources includes the intent-level coarse-grained network resource deployment and the user-level fine-grained network resource deployment.

Further, in step S2042, the intent-level coarse-grained network resource deployment is modeled using a non-cooperative game model, three basic elements are defined: a participant set, a policy set of a participant and a utility set of the participant, and an expression of a game problem G is as follows:

$$G = [N, (X_i)_{i \in N}, (U_i)_{i \in N}], \tag{4}$$

$N = \{1, 2, \ldots, n\}$ representing a participant set in the game problem, namely, a set of intents to participate in resource competition, X representing a policy set of a participant, namely, a policy set for acquiring network resources for the intents to participate in resource competition, and U representing a utility function of the participant, a metric being configured to measure benefits gained from the intents to participate in the game;

an expression of a utility function for a follower with low priority intent participating in the game is as follows:

$$U_n\!\left(r_{V_{s,n}}(t)\right) = F_n\!\left[r_{V_{s,n}}(t), R_s(\cdot), a_s^n\right] - \sum_{s \in S} \sum_{u \in U_n} p_{V_s}^{N_l} r_{V_{s,u}}(t), \qquad (5)$$

$$n \in N_l,$$

an expression of a utility function for a leader with high priority intent participating in the game is as follows:

$$U_n\!\left(r_{V_{s,n}}(t)\right) = F_n\!\left[r_{V_{s,n}}(t), R_s(\cdot), a_s^n\right] - \sum_{s \in S} \sum_{u \in U_n} p_{V_s}^{N_h} r_{V_{s,u}}(t), \qquad (6)$$

$$n \in N_h,$$

$p_{V_s}$ representing unit pricing factors for resources $V_s$ belonging to different dimensions, $$p_{V_s}^{N_h} \text{ and } p_{V_s}^{N_l}$$

representing unit resource prices of a high priority intent and a low priority intent, the unit resource price of the high priority intent being lower than that of the low priority intent to cause the resource requirement of the high priority intent to be more easily satisfied, and the unit resource prices being selected and formulated by operators according to user requirements, $N_l$ representing a set of high priority network intents, and $N_h$ representing a set of low priority network intents, expressions of coarse-grained resource allocation problems for the leader and follower are as follows:

$$\max U_n\!\left(r_{V_{s,u}}(t)\right), n \in N_h \text{ or } N_l \qquad (7)$$

$$\text{subject to:} \quad \begin{array}{l} C1\colon \sum_{s \in S} \sum_{u \in U_n} r_{V_{s,u}}(t) \le V_s \\[4pt] C2\colon \sum_{u \in U_n} r_{V_{s,u}}(t) \le r_{V_{s,u}}(t) \\[4pt] C3\colon R_s\!\left(r_{V_{s,u}}(t)\right) \ge R_{s,u}^{thr} \text{ or } R_s\!\left(r_{V_{s,u}}(t)\right) \le R_{s,u}^{thr}, s \in T, \\[4pt] C4\colon a_s^n \in [0, 1) \\[4pt] C5\colon \sum_{s \in S} a_s^n = 1 \end{array}$$

a constraint condition C1 representing a constraint on the number of network resources provided by the network, a constraint condition C2 representing a constraint on the number of network resources allocated to each user, $r_{V_{s,n}}(t)$ representing a corresponding network resource vector allocated to a user u for the performance metric s, a constraint condition C3 representing that a threshold value performance metric must be greater than a preset threshold value, $$R_{s,u}^{thr}$$

representing a corresponding minimum threshold value of the user u for the performance metric s, a constraint condition C4 representing a weight of the performance metric, and a constraint condition C5 representing that a sum of weights of the performance metrics is limited; and an expression of an optimal solution of coarse-grained resource allocation based on Stackelberg game equilibrium is as follows:

$$U_n r_{V_{s,u}}^*(t) \ge U_n r_{V_{s,u}}(t) \forall \, r_{V_{s,u}}(t), n \in N_h \text{ or } N_l, \qquad (8)$$

$r^*_{V_{s,u}}(t)$ representing an optimal coarse-grained resource allocation policy of the wireless network to the intent n.

Further, the utility function is influenced by the participants' own policy choices and is also related to the other participants' policy choices.

Further, in step S2043, a user-level fine-grained network resource deployment problem is described as a multi-objective optimization problem with O+T optimization objectives, and an expression is as follows:

$$\max_{u \in U_n, r_{V_{s,n}}(t)} \left[ \begin{array}{l} R_1\!\left(r_{V_1,u}(t)\right), R_2\!\left(r_{V_2,u}(t)\right), \ldots, R_T\!\left(r_{V_T,u}(t)\right), \\[4pt] R_{1+T}\!\left(r_{V_{1+T},u}(t)\right), R_{2+T}\!\left(r_{V_{2+T},u}(t)\right), \ldots, R_{O+T}\!\left(r_{V_{O+T},u}(t)\right) \end{array} \right] \qquad (9)$$

$$\text{subject to:} C1 \sim C3,$$

O being an optimized performance metric set, T being a threshold value performance metric set, S being an intent performance metric set, O+T=S.

Further, based on the low complexity solution of a weighted sum, the multi-objective optimization problem is converted into:

$$\max_{u \in U_n, r_{V_{s,n}}(t)} \sum_{s \in O \cup T} a_s^n R_s\!\left(r_{V_{s,u}}(t)\right) \qquad (10)$$

$$\text{subject to:} C1 \sim C5,$$

In a second aspect of the present application, the present application also provides a resolution apparatus for intent-based wireless network resource conflicts, including:

an interface module, configured to periodically monitor an intent performance state in a current wireless network and acquire data information about a newly-added intent; a solution module, configured to generate a pre-allocation policy satisfying requirements of the newly-added intent according to resource requirement information about the newly-added intent, determine whether multidimensional network resource conflicts occur according to a network pre-configuration policy of the newly-added intent and a network configuration policy being executed in a network, redeploy network resources to solve corresponding network resource conflicts, and issue a network configuration policy without the network resource conflicts to be executed in the network; a feedback module, configured to return an intent performance state and/or a wireless network resource configuration policy before executing a current network configuration policy, and a state and wireless network data after executing the current network configuration policy; and a storage module, configured to store the wireless network data, data information about historical intent requirements being executed in the network, an execution state of a historical network configuration policy, and network element parameters and/or a wireless network resource scheduling state before execution.

Further, the solution module includes: a determination unit, configured to generate the pre-allocation policy satisfying the requirements of the newly-added intent according to the resource requirement information about the newly-added intent, and determine whether network resource conflicts occur according to the network pre-configuration policy of the newly-added intent and a network configuration policy being executed in the network; a calculation unit, configured to model relationships of competition for network resources between different intents according to the stored historical intent requirement information and newly-added intent requirement information, and redeploy the network resources through a relevant game model and a solution method for coarse and fine grained resource allocation to solve corresponding network resource conflicts, and formulate a network element parameter configuration and/or a wireless network resource allocation policy satisfying an intent satisfaction degree; and an issuing unit, configured to issue a network configuration policy without the network resource conflicts to be executed in a low-level network infrastructure.

Compared with the related art, the present application has the following beneficial effects.

1. The resolution method for intent-based wireless network resource conflicts and an apparatus thereof described in the present application are different from a resource conflict resolution solution in a core network, and the method is applicable to resolving multidimensional network resource conflicts in the intent-based wireless network, improving the operation efficiency, reducing the wireless network operation and maintenance costs, and promoting the deployment and operation of future multidimensional resource-driven intelligent applications.

2. According to the resolution method for intent-based wireless network resource conflicts and an apparatus thereof described in the present application, by determining to receive or reject the execution of the network configuration policy, a bias of an implementation satisfaction degree of a network configuration policy is determined through the relative priority of the intent requirements, and network resource conflicts of intent requirements of different priorities are resolved.

3. According to the resolution method for intent-based wireless network resource conflicts and an apparatus thereof described in the present application, the idea related to game theory and the method for considering the bias of user performance metrics are utilized to perform the intent-level coarse-grained deployment and the user-level fine-grained deployment on the resources to solve network resource conflicts involving multidimensional resources and multidimensional performance metrics.

BRIEF DESCRIPTION OF THE DRAWINGS

FIG. 4 is a schematic diagram of executed lifecycle relationships between network configuration policies of intents according to an example of the present application;

FIG. 6 is a flow chart of a resolution apparatus for intent-based wireless network resource conflicts according to an example of the present application;

FIG. 7 is a schematic diagram of a resolution apparatus for wireless network resource conflicts according to an example of the present application.

DETAILED DESCRIPTION

In order to understand the above objectives, features and advantages of the present application more clearly, the present application will be further described in detail with the attached drawings and specific examples. It is to be noted that the examples of the present application and the features in the examples can be combined with each other without conflicts.

In intent-based wireless networks, different types of intents may have very different characteristics: for example, for communication performance, different types of intents may have different transmission rate and delay requirements for communication resources; and for resources of different dimensions, such as communication and computation resources, different types of intents also have different requirements. For example, for the intent of internet of vehicles related to internet of vehicles service, the safe operation of assisting driving vehicles have requirements for communication and computation resources, while for example, the high-definition communication intent of a user only has requirements for communication resources. In addition, there is a difference in an intent priority between different intents, with higher priority intents being more important and needing to be satisfied first than lower priority intents. Future intelligent mobile applications will rely on multidimensional, such as communication and computation resources in the wireless network to support and implement, therefore, different requirements will be put forward for different dimensions of network resources. However, due to the high dynamic characteristics of the environment, and the missing of prior information of multidimensional resources, there are many complex correlation relationships such as competition, cooperation, restriction and coupling between the matching of resources and intents. When different resource data are allocated and scheduled in the wireless network, there will be incompatible behaviors due to the wireless network configuration policy in the intent priority, the scope of network operation, and the parameters of network element operation, thus resulting in conflicting multidimensional resource settings not being satisfied at the same time and successfully implemented in the network, even causing the problems of decreased network performance and decreased intent and user satisfaction degree. Therefore, the present application proposes a resolution method for intent-based wireless network resource conflicts and an apparatus, to solve the problem of conflicting requirements between multidimensional, such as communication and computation resources in the wireless network, and promote the deployment and operation of future multidimensional resource-driven IBNs.

EXAMPLES

Figure 1:
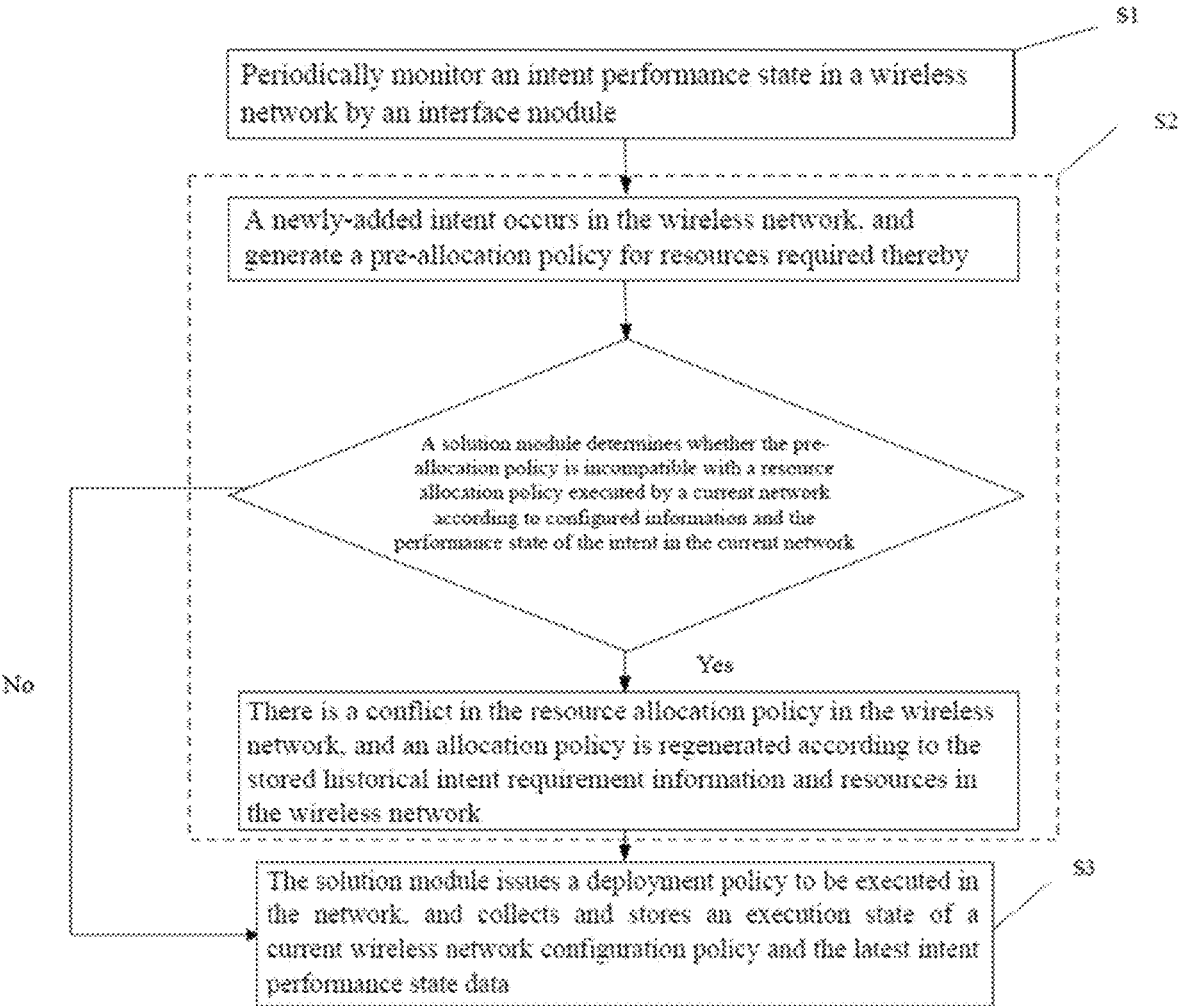
FIG. 1 is a flow chart of a resolution method for intent-based wireless network resource conflicts according to an example of the present application.

As shown in FIG. 1, a resolution method for intent-based wireless network resource conflicts specifically includes the following steps.

At S1: an interface module is configured to periodically monitor an intent performance state in a current wireless network and acquire multidimensional resource requirement information about a newly-added intent.

Specifically, the multidimensional resources refer to communication and computation resources in the wireless network; communication resources refer to frequency spectrum, channel and power allocation resources in the wireless network; computation resources refer to resources such as the number of clocks of a cloud server processor and the number of clocks of an edge processor in the wireless network; and a network configuration policy includes the following data: a network area range acted on by the network configuration policy of the intent requirement, an executed lifecycle, adjusted wireless network element parameters and scheduled wireless network resources including communication and computation resources distributed in the network. An intent requirement priority can be selected and formulated by operators according to user requirements.

Figure 2:
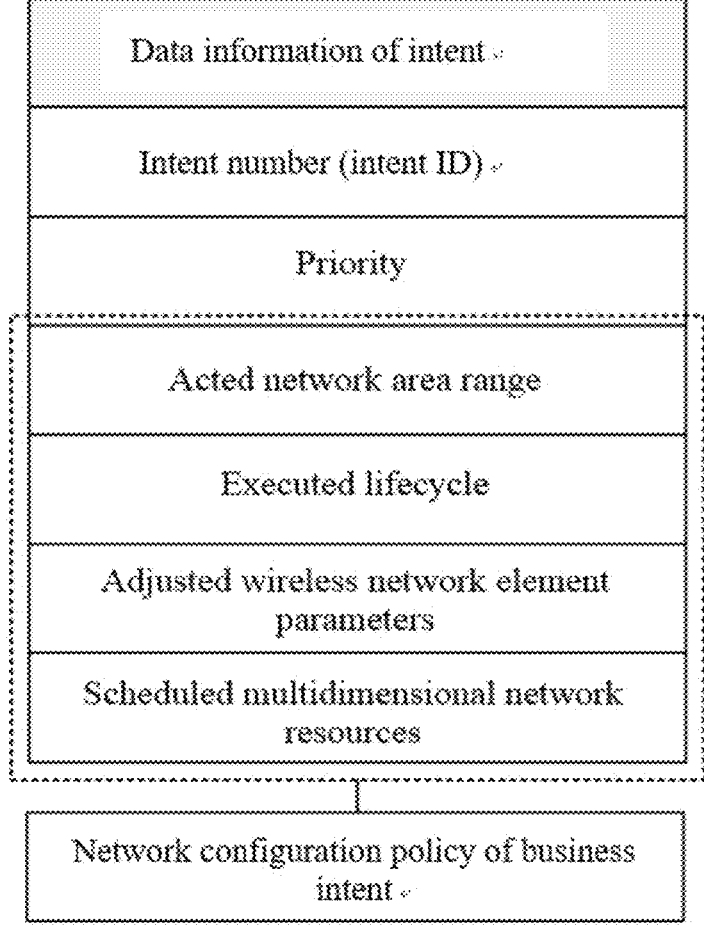
FIG. 2 is a flow chart of intent requirement data information according to an example of the present application.

Specifically, as shown in FIG. 2, each data is detailed as follows.

1) An intent number (intent ID) is a sequence number to identify the intent requirement to distinguish and identify different intent requirements. The intent number can be set by default, and is automatically numbered by a network system according to certain rules; can also be specified manually when the intent requirement is input; and can combine these two aspects. The specific intent number setting rules can be formulated according to actual requirements of customers and operation specifications of operators.

2) A priority is configured to indicate a priority of the intent requirement, and is determined by a binary variable. 1 represents that the intent is a high priority, 0 represents that the intent is a low priority, and the priority represents a weight value of the importance of the intent, affecting coarse-grained deployment of network resources of the intent. The intent with a higher priority will obtain a higher intent proportioning weight, and the unit resource price of a high priority intent is lower than that of a low priority intent. Therefore, in a wireless network, the intent requirement with the high priority will be satisfied earlier than the intent requirement with the low priority, and the importance of the intent requirement can be better balanced by setting the priority, thus guaranteeing the quality of service of the wireless network with the high priority intent.

It is to be noted that the priority can be preset by default; can be specified manually when the intent requirement is input; and can combine these two aspects. The specific priority setting rules of intent requirements can be formulated according to the actual requirements of customers and the operation specifications of operators.

Figure 3:
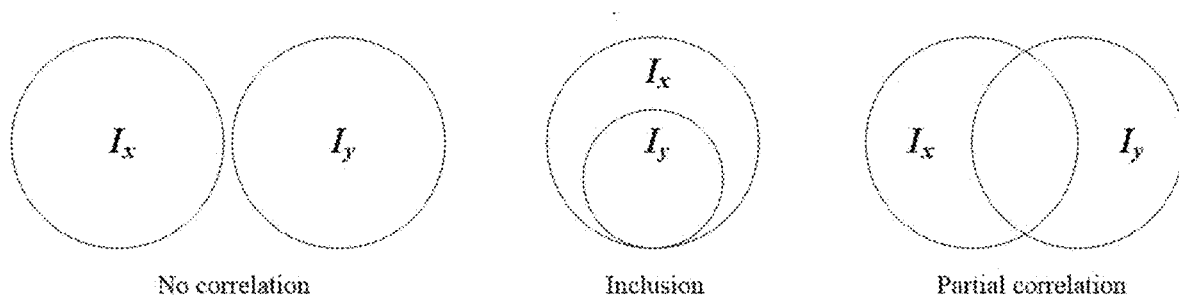
FIG. 3 is a schematic diagram of acted network area range relationships between network configuration policies of intents according to an example of the present application.

3) An acted network area range is configured to indicate an execution range of a network configuration policy, which may include one or more cells, or one or more base stations, sub-networks or the whole network. As shown in FIG. 3, taking the network configuration policies $I_x$ and $I_y$ of two intent requirements as examples, there are three relationships in the acted network area range: inclusion, no correlation and partial correlation. Inclusion refers to that a network area range where a network configuration policy with one intent requirement acts is included in a network configuration policy with another intent requirement, or completely coincides with the network configuration policy with another intent requirement; no correlation refers to that there is no overlapped acted network area range between network configuration policies; and partial correlation refers to that an overlapped acted network area range exists between network configuration policies of intent requirements, but a network area range acted on by a network configuration policy without any intent requirement is included in a network configuration policy of other intent requirements or completely coincides with a network configuration policy of another intent requirement, and the relationship between network area ranges acted on by multiple network configuration policies is similar, and can be extended according to this extension.

Figure 4:
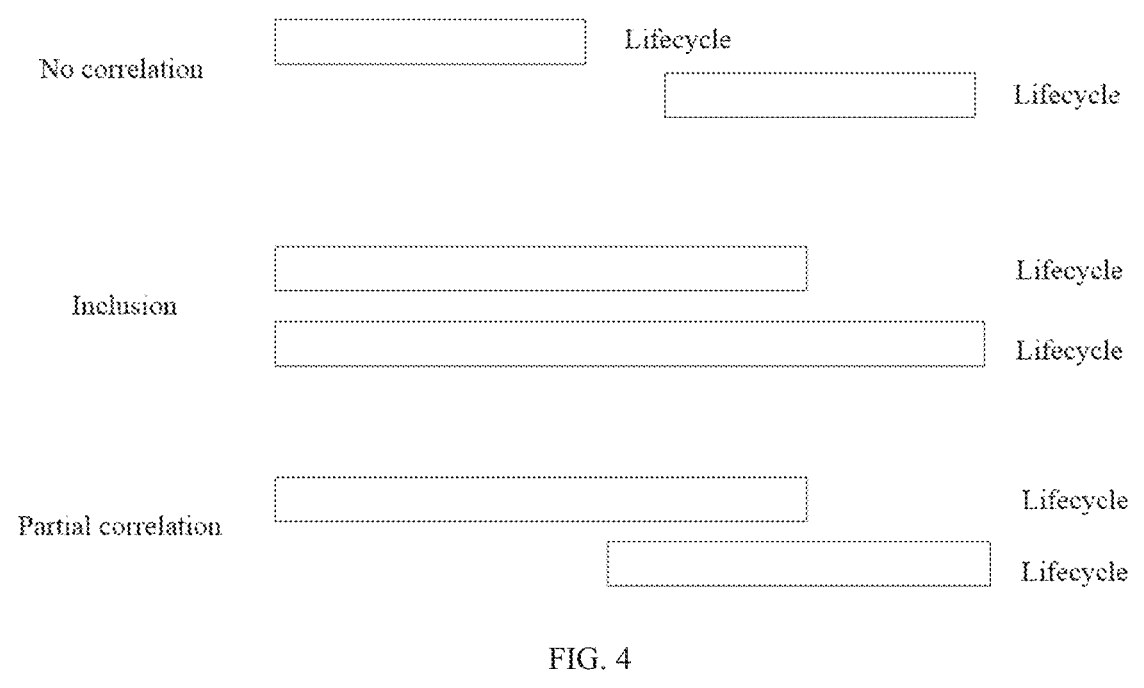

4) An executed lifecycle is configured to indicate a time when the network configuration policy is executed and an operation duration; a network configuration policy is executed when a starting moment for executing the network configuration policy arrives; and when a termination time for executing the network configuration policy arrives or the operation duration expires, the running of the network configuration policy is terminated. As shown in FIG. 4, taking the executed lifecycle of the network configuration policies $I_x$ and $I_y$ of two intent requirements as examples, similar to the relationship between the network area range acted on by the network configuration policies, the executed lifecycle of the network configuration policies $I_x$ and $I_y$ of the intent requirements also has three relationships: inclusion, no correlation and partial correlation. Inclusion refers to that an executed lifecycle of the network configuration policy with one intent requirement is included in the network configuration policy with another intent requirement, or completely coincides with the network configuration policy with another intent requirement; no correlation refers to that no overlapped executed lifecycle exists between network configuration policies; and partial correlation refers to that an overlapped executed lifecycle exists between network configuration policies of intent requirements, but an executed lifecycle without any network configuration policy is included in a network configuration policy of other intent requirements or completely coincides with a network configuration policy of another intent requirement. The executed lifecycle relationship of the network configuration policy with multiple intent requirements is similar, and can be extended according to this extension.

5) Adjusted wireless network element parameters are configured to indicate parameter values or parameter change values that the network configuration policy needs to adjust to the wireless network element; and the wireless network element parameters include parameters of wireless network element equipment such as a wireless remote radio frequency unit, a high power base station and a centralized baseband processing unit.

6) Scheduled multidimensional network resources are configured to indicate a scheduling policy of the network configuration policy on the wireless network resources; and the network resources include two types of resources in the wireless network, namely, wireless communication resources and computation resources.

At S2: resources required for the newly-added intent are pre-allocated when the newly-added intent occurs in the wireless network, and a pre-allocation resource configuration policy is generated.

Specifically, a pre-configuration policy refers to a pre-allocation policy complying with the newly-added intent requirement generated according to resource requirement information about the newly-added, including a number (intent ID) of the intent requirement, a priority and a network configuration policy.

The acted network area range and the executed lifecycle by the pre-allocation policy of newly-added intent requirements are compared with the corresponding data information of the network configuration policy being executed in the network by a solution module. If the overlapped network area range and/or the overlapped executed time period occur, whether there is a network resource conflict is determined, otherwise, step S3 is executed.

Whether there is a network resource conflict between the pre-configuration policy of the newly added intent requirement and the network configuration policy being implemented in the network is determined by the solution module according to the data information about the intent requirement stored in a storage module.

If there is a network resource conflict, the network resource conflict is solved, otherwise, step S3 is executed; the network configuration policy being implemented in the network refers to the network configuration policy being executed which is formulated according to the intent requirement in the current network; the execution state is configured to indicate the state of the network configuration policy being implemented and executed in the wireless network, including the state of execution success, execution failure or being executed; and the setting of the reference state parameter of execution state can present the implementation of network configuration policy to mobile network operators on the one hand, and can be used to solve network resource conflicts on the other hand.

At S3: a conflicting network resource configuration policy without intent requirements is issued to be executed in an RAN by the solution module, and an execution state of the current network configuration policy and the latest wireless network data are collected and sent to a storage module by a feedback module to serve as a reference state parameter of a network resource conflict after resolution.

Wireless network data includes, but not limited to, historical multidimensional network resource requirements of the intent, multidimensional performance metric bias of users under the intent, priority of the intent, allocation states of computation resources distributed in the wireless network, interference states of the wireless network, coverage states of the wireless network, average delay and delay jitter of the wireless network, the number of active links of the wireless network, a throughput per unit area of the wireless network, average transmission capacity of users, user mobility and social relationship attributes, intent and user relationship attributes, state information about wireless network element equipment, etc.

Figure 5:
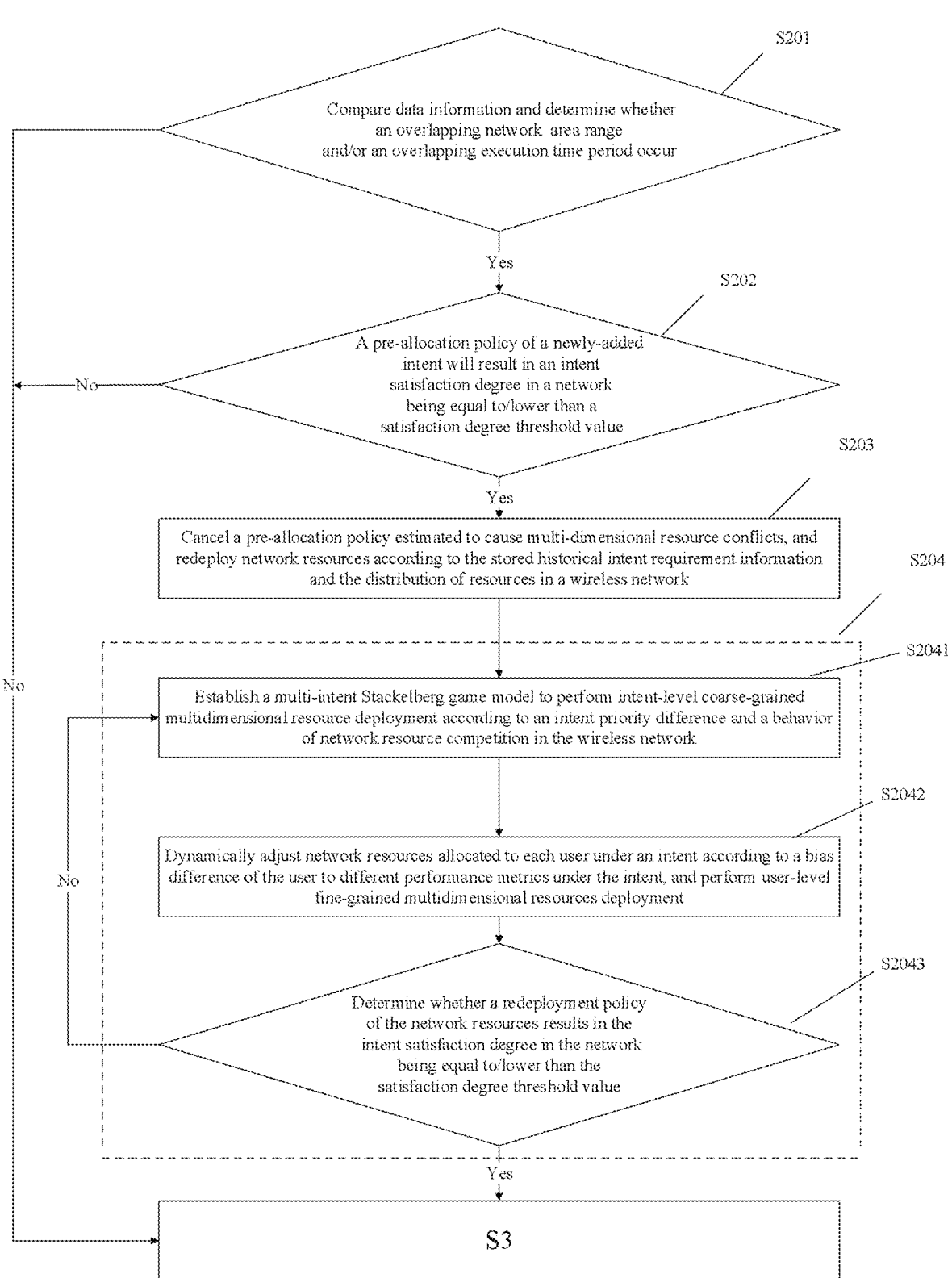
FIG. 5 is a flowchart for resolving intent-based wireless network resource conflicts according to an example of the present application.

As shown in FIG. 5, the step 2 in the above example specifically includes the following steps.

At S201: the solution module, according to the data information about the intent requirement stored in the storage module, is configured to generate a pre-allocation policy complying with the newly-added intent requirement according to the resource requirement information about the newly-added intent; and the acted network area range and the executed lifecycle by the pre-allocation policy of newly-added intent requirements are compared with the corresponding data information of the network configuration policy being executed in the network. If the overlapped acted network area range and/or the overlapped executed time period occur, step S202 is executed, otherwise, step S3 is executed.

Specifically, when the relationship between the network configuration policies of the acted network area range is inclusion or partial correlation, the overlapped acted network area range will occur; and when the relationship of the executed lifecycle between network configuration policies is inclusion or partial correlation, the overlapped executed time period may occur.

At S202: according to the data information about the intent requirement stored in the storage module, a preset satisfaction degree function is used to predict the satisfaction degree of the user in the network after executing the pre-allocation configuration policy of the newly-added intent by the solution module in combination with the parameter values required for the pre-allocation configuration policy of the newly-added intent and the network configuration policy being executed in the network and the wireless network state information, if the distribution of network resources in the wireless network and the resource requirement information about the network configuration policy being executed in the network and the pre-allocation policy of the newly-added intent are combined, after calculation, the intent satisfaction degree in the current wireless network will decrease to be equal to/lower than the preset minimum satisfaction degree threshold value is obtained, it is determined that after the pre-allocation policy of the newly-added intent is executed, a network resource conflict will occur in the current network, step S203 is executed, otherwise, step S3 is executed.

The minimum satisfaction degree threshold value refers to the worst situation that a certain intent n in the wireless network can tolerate the self-organizing performance; if the satisfaction degree is lower than the threshold value, the intent n cannot operate normally; illustratively, if before the newly-added intent occurs, when the communication delay which can be reached by an intent a is 20 ms and the calculated intent delay is 50 ms, the satisfaction degree of the intent a is 0.90, and the minimum satisfaction degree threshold value of the intent a for the communication metric is 0.85; after an intent b is newly added, since the intent b needs to be executed within the same network area range and overlapped time, the part of the network bandwidth originally belonging to the intent a will be occupied by the intent b; if the intent b and the intent a access the same cloud server, then the part of the computation resources originally belonging to the intent a will also be occupied by the intent b; at this moment, the network delay and the computation delay which can be reached by the intent a will increase, and then the satisfaction degree of the intent a will decrease; and if the satisfaction degree of the intent a is higher than 0.85 after the intent b is newly added, no network resource conflict occurs; otherwise, it is determined that the network resource conflict occurs.

At S203: a newly-added intent pre-allocation policy estimated to result in the network resource conflicts in the current wireless network is canceled, and the current wireless network resources are redeployed according to the stored historical intent requirement information and the distribution of resources in the wireless network.

At S204: wireless network resources are redeployed in the overlapped executed lifecycle and/or the overlapped acted network area range of the network configuration policy where the network resource conflict occurs, including the intent-level coarse-grained network resource redeployment based on a Stackelberg game and the user-level fine-grained network resource redeployment based on multi-objective optimization. The coarse-grained resource deployments and the fine-grained resource deployment will be looped until a wireless network resource configuration policy where an intent satisfaction degree in a current wireless network is higher than a preset minimum satisfaction degree threshold value is finally generated, step S3 is executed, otherwise, step S2041 is returned.

Further, the S204 specifically includes the following steps.

At S2041: different intents as game participants are modeled into a non-cooperative game model by the solution module according to the storage module in combination with the stored historical intent requirement information and the newly-added intent requirement information. In the case where there is a difference in resource limited distribution and intent priority in the wireless network, a multi-intent Stackelberg game model is used to obtain a coarse-grained resource allocation policy of the wireless network to the intent n, and the S2042 is executed.

The priority represents a weight value of the importance of the intent, which affects the coarse-grained redeployment of network resources of the intent. Furthermore, the unit resource price of the intent with a high priority is lower than that of the intent with a low priority; therefore, in the wireless network, the intent requirement with a high priority will be satisfied earlier than the intent requirement with a low priority.

At S2042: the network resources allocated to each user under the intent are dynamically adjusted by the solution module according to the requirements that the users belonging to different intents have different biases on network metrics of different dimensions and the differences in the distribution of the users in the network, and the differentiated requirements of the users and the bias of the performance metrics are satisfied to obtain the user-level fine-grained network resource deployment. The intent-level coarse-grained network resource deployment and the user-level fine-grained network resource deployment are combined by the solution module to obtain a configuration policy for the redeployment of the wireless network resources, and the S2043 is executed.

At S2043: the preset satisfaction degree function is used to calculate the satisfaction degree of the user in the network after executing the redeployed configuration policy of the wireless network resources by the solution module according to the data information about the intent requirement stored in the storage module, and according to the redeployed configuration policy of the wireless network resource and the intent requirement information and network resource distribution information in the network. After calculation, if it is obtained that the intent satisfaction degree in the current wireless network will decrease to be equal to/lower than a preset minimum satisfaction degree threshold value, it is determined that if the redeployed configuration policy of the wireless network resource is executed, a network resource conflict still occurs in the current network, then step S2041 is executed, otherwise, step S3 is executed.

Illustratively, in a multi-objective optimization method, under each intent, each user equipment attempts to optimize multidimensional performance metrics, but the network resources allocated to each intent are limited, and the network resources need to be allocated twice to meet the requirements of each user. The solution of the problem that the network resources need to be allocated twice is to solve N optimization objects, which can be expressed as follows:

$$\min R(\vec{x}) = \left[R_1(\vec{x}), R_2(\vec{x}), \dots, R_{O+T}(\vec{x})\right]^T$$
$$\text{s.t. } g_m(\vec{x}) \le 0, m = 1, 2, \dots, M$$

$R(\vec{x})$ representing a template vector of a multi-dimensional performance value function of a user, $R_{O+T}(\vec{x})$ representing the multi-dimensional performance value function of the user under the intent, $g_m(\vec{x})$ representing a constraint function, $\vec{x} = [x_1, x_2, \dots, x_K]^T \in \mathbb{X}$ representing a set of k-dimensional definite parameter vectors in a decision space, being the configuration of network element parameters and/or the allocation of multidimensional network resources, and an optimization problem being solved by aggregating all objective functions into a single objective function by means of a weighted sum, a weighted product and a weighted Chebyshev, and the multi-performance value function including a communication performance value function and a computation performance value function.

Illustratively, some of the communication performance value functions that may be involved in the wireless network may include a user's signal-to-interference-and-noise ratio (SINR) function, a user's rate value function, a user's task transmission delay, etc.

Illustratively, an expression of the user's SINR function is as follows:

$$SINR_u(t) = \frac{P_u h(t)^2 x^{-a}}{I + \sigma^2 W},$$

illustratively, an expression of the user's rate value function is as follows:

$$R_u(t) = W \log_2(1 + SINR_u(t)), \text{ and}$$

illustratively, an expression of the user's task transmission delay is as follows:

$$\tau_{trans}(t) = \frac{q_u}{R_u(t)},$$

$P_u$ representing a transmission power allocated to a user by a base station, $h(t)^2$ representing a small-scale fading coefficient, $x^{-\alpha}$ representing a path loss with a coefficient of $\alpha$, I representing the interference power in the wireless network, $\rho^2 W$ representing a product of a Gaussian white noise power spectral density and a transmission bandwidth, W representing the transmission bandwidth, and $q_u$ representing a transmission task size of the user.

Illustratively, some of the computation performance value functions that may be involved in the wireless network include the user's cloud computation task computation delay, the user's cloud computation efficiency, etc.

Illustratively, an expression of the user's cloud computation task computation delay is as follows:

$$\tau_{cloud} = \frac{q_u}{R_u^U(t)} + \frac{Q_u}{R_u^D(t)} + \frac{D_u}{f_c},$$

$q_u$ representing a size of a calculation task uploaded by the user, $Q_u$ representing a size of a calculation result, $$R_u^U(t) \text{ and } R_u^D(t)$$

representing an uplink rate and a downlink rate of the user, $D_u$ representing the number of calculation clocks required for the calculation task of the user, and $f_c$ representing the computation capability of a cloud server expressed by a clock frequency of a central processing unit.

For solving a single objective function, the artificial intelligence method of deep reinforcement learning can be utilized to solve the problem by combining the wireless network data and the network history configuration policy. A system state of the deep reinforcement learning algorithm includes a link state, a key metric and available network resources. A system action of the deep reinforcement learning algorithm includes the configuration of network element parameters where a conflict occurs or/and the allocation of multidimensional network resources; and a reward function of the deep reinforcement learning algorithm refers to an objective function of a single objective optimization problem.

A flow chart of a resolution apparatus for intent-based wireless network resource conflicts according to an example of the present application is as shown in FIG. 6, the step 3 in the above example specifically includes the following steps.

At S301: data information about a network configuration policy which has resolved a network resource conflict is stored in a storage module by a solution module to serve as a reference state parameter for coordinating a next network resource conflict.

The reference state parameter includes the collection and storage of current network element parameters and/or a wireless network resource configuration policy and the latest intent state data, which are used as bases for generating a network resource pre-allocation policy when a newly-added intent occurs, the issue of a network configuration policy without a network resource conflict to be executed in a low-level network infrastructure through network management and service technologies, and the collection and storage of an execution state of the current network configuration policy and the latest wireless network data, which are used as reference state parameters for solving a next network resource conflict.

At S302: current network element parameters and/or network resource scheduling states are collected by a feedback module, and sent to the storage module for a reference of intent requirement information when a network resource conflict occurs next time.

At S303: a network configuration policy without an intent requirement conflict is issued by the solution module to be executed in a low-level network infrastructure through network management and service technologies.

The network management and service technologies can be technologies for controlling and managing underlying physical equipment, such as SDN and NFV, and the present application does not make any limitation thereon.

At S304: an execution state of the current network configuration policy and the latest wireless network data are collected by the feedback module, and sent to the storage module to serve as a reference state parameter for solving a next network resource conflict.

Figure 8:
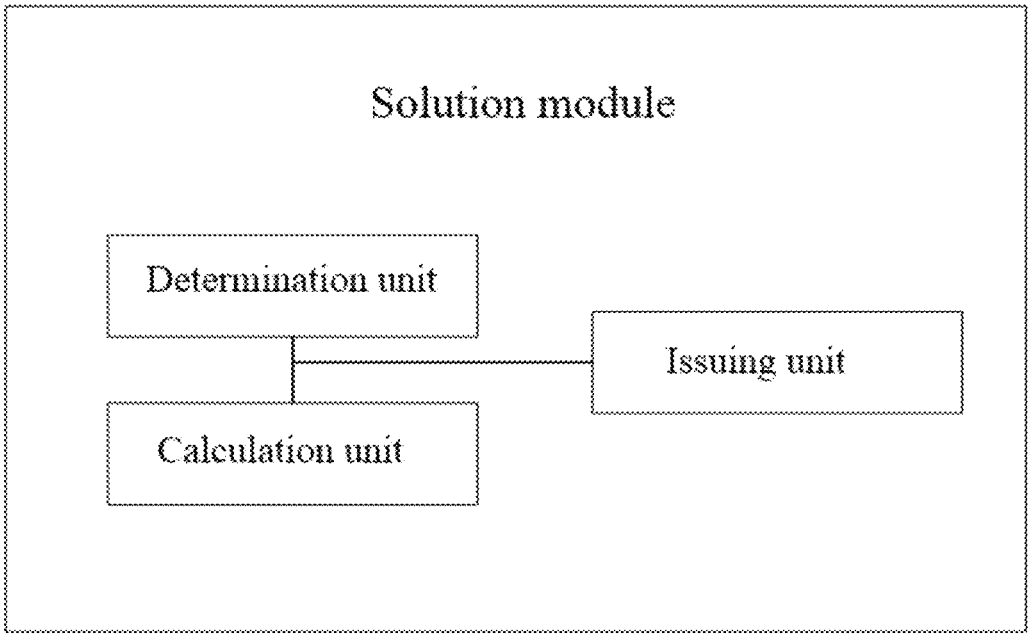
FIG. 8 is a schematic diagram of a solution module according to an example of the present application.

As shown in FIGS. 7 and 8, the network resource conflict resolution apparatus of the wireless network includes: an interface module, a solution module, a feedback module and a storage module.

The interface module is configured to acquire the data information of the current intent requirement; the solution module is configured to determine whether a network resource conflict occurs according to a network configuration policy of the current intent requirement and a network configuration policy of the intent requirement being executed in a network to solve corresponding intent requirement conflicts, redeploy network resources, and issue a network configuration policy without the network resource conflicts to be executed in the network; a feedback module is configured to return network element parameters and/or wireless network resource scheduling state before executing a current intent requirement, and an execution state and wireless network data after executing the current intent requirement; and the storage module is configured to store the wireless network data, data information of a network configuration policy about historical intent requirements being executed in the network, an execution state of the network configuration policy of the historical intent requirement, and network element parameters and/or a wireless network resource scheduling state before execution.

Further, the data information of the intent requirement includes: an intent number (intent ID), a priority, and a network configuration policy. The network configuration policy includes: an acted network area range, an executed lifecycle, adjusted wireless network element parameters and scheduled wireless network resources. The specific content of each data information is described as follows.

1) An intent number (intent ID) is a sequence number configured to identify intent requirements to distinguish and identify different intent requirements. 2) A priority is configured to indicate a priority of intent requirements, including an absolute priority and a relative priority. 3) The acted network area range is configured to indicate an execution range of a network configuration policy of an intent requirement, which may include one or more cells, or one or more base stations, sub-networks or the whole network. 4) The executed lifecycle is configured to indicate an execution time of a network configuration policy of an intent requirement, and an operation duration. 5) The adjusted wireless network element parameters are configured to indicate parameter values or parameter change values that a network configuration policy of an intent requirement needs to adjust to the wireless network element. 6) The scheduled wireless network resources are configured to indicate a scheduling policy of the network configuration policy of the intent requirement on the wireless network resources.

The execution state is configured to indicate the state of an intent-required network configuration policy to implement execution in a wireless network, including the state of execution success, execution failure or being executed.

Wireless network data includes, but not limited to, the interference state of the wireless network, coverage states of the wireless network, average delay and delay jitter of the wireless network, the number of active links of the wireless network, a throughput per unit area of the wireless network, average transmission capacity of users, user mobility and social relationship attributes, intent and user relationship attributes, state information about wireless network element equipment, etc.

Network element parameters and/or a wireless network resource scheduling state before the execution of the network configuration policy of the historical intent requirement is configured to revoke the execution of the network configuration policy of the intent requirement and the redeployment of network resources.

Alternatively, as shown in FIG. 8, the solution module includes a determination unit, a calculation unit and an issuing unit. The determination unit is configured to determine the occurrence of network resource conflicts according to the network pre-configuration policy of the current intent requirement and the network configuration policy of the intent requirement being executed in the network, and redeploy the network resources according to absolute priority data information of conflicting network resources and user performance metric bias; the calculation unit is configured to formulate a network element parameter configuration and/or a network resource allocation policy which best meets the network resource requirements with conflicting intents through the resolution methods for related parameter coordination and multidimensional resource conflicts; and an issuing unit is configured to issue the network configuration policy without the network resource conflicts to be executed in low-level network equipment.

In the above example, the mutual coupling or communication connection between the modules and/or units shown or discussed can be the indirect coupling or communication connection through some interfaces, apparatus or modules.

In addition, the above modules and/or units can be implemented in the form of hardware or in the form of hardware plus software functional modules; modules and/or units implemented in the form of software functional modules can be stored in a computer-readable storage medium; and a storage medium has stored therein a computer program, which, when executed by a processor, implements the steps of the above wireless network resource conflict resolution method.

While examples of the present application have been shown and described, it will be understood by those skilled in the art that various changes, modifications, substitutions and alterations can be made herein without departing from the principles and spirit of the present application, the scope of which is defined by the appended claims and equivalents thereof.

The invention claimed is:

1. A resolution method for intent-based wireless network resource conflicts, comprising the following steps:

step 1: periodically acquiring configured resource information about a current wireless network and an intent performance state in the current network;

step 2: pre-allocating resources required for a newly-added intent when the newly-added intent occurs in the wireless network, and generating a pre-allocation resource configuration policy, determining whether the pre-allocation resource configuration policy is incompatible with a resource configuration policy being executed in the current network according to the configured resource information about the wireless network and the intent performance state in the current network, resource conflicts existing in the wireless network resource configuration policy if the pre-allocation resource configuration policy is incompatible with the resource configuration policy being executed in the current network, and network resources being redeployed according to stored historical intent requirement information and the distribution of resources in the wireless network; and step 3: issuing a resource pre-allocation policy to be executed in a radio access network (RAN) if a current allocation resource configuration policy is compatible with the resource configuration policy being executed in the current network, and collecting and storing an execution state of a current wireless network resource configuration policy and latest intent performance state data, and a number of original intents in the wireless network is $\mathcal{N}$, and an expression of a preset intent satisfaction degree function is as follows:

$$SR(H_n(t)) = \frac{H_n(t) - H_{n,worst}}{H_{n,best} - H_{n,worst}}, \tag{1}$$

$H_n(t)$ representing a multidimensional performance of a certain intent n at a time t, and $H_{n,best}$ and $H_{n,worst}$ representing best and worst multidimensional performance function values of the certain intent n;

an expression of the multidimensional performance is as follows:

$$H_n(t) = F_n[r_{V_{s,n}}(t), R_s(\cdot), a_s^n], \tag{2}$$

$F_n[\bullet]$ representing a multidimensional performance function of the certain intent n, $R_{V_{s,n}}(t)$ representing a corresponding network resource vector allocated to the intent n for a performance metric s, $R_s(\bullet)$ representing a specific performance numerical function corresponding to the performance metric s, and $$a_s^n$$

representing a preset weight of the intent n to the performance metric s, the greater the weight, the higher the importance of the performance metrics to the intent n.

2. The resolution method for intent-based wireless network resource conflicts according to claim 1, wherein in step 2, an acted network area range and an executed lifecycle by a pre-allocation policy of the newly-added intent are compared with corresponding data information of a network configuration policy being executed in a network, and if an overlapped acted network area range and/or an overlapped executed time period do not exist, the pre-allocation policy of the newly-added intent is issued to be executed in a low-level network infrastructure through network management and service technologies, and otherwise, a satisfaction degree of a user in the network after executing a pre-allocation configuration policy is predicted using a satisfaction degree function by combining the pre-allocation configuration policy of the newly-added intent with parameter values and wireless network state information required for the network configuration policy being executed in the network, the intent referring to a desired state or effect of the RAN, being in a natural language form or being a combination of relevant keywords, one intent being capable of serving one or more users, and a current intent referring to an intent to implement execution in the RAN.

3. The resolution method for intent-based wireless network resource conflicts according to claim 1, wherein in step 1, an expression of the multidimensional performance function $F_n[\cdot]$ of the intent n is as follows:

$$F_n\left[r_{V_{s,n}}(t), R_s(\cdot), a_s^n\right] = \frac{\sum_{u \subset U_n}\left[\frac{a_1^n R_1\left(r_{V_1,u}(t)\right)}{R_1^{max}} + \frac{a_2^n R_2\left(r_{V_2,u}(t)\right)}{R_2^{max}} +, \ldots, + \frac{a_s^n R_s\left(r_{V_s,u}(t)\right)}{R_S^{max}}\right]}{s \cdot U_n}, \quad (3)$$

$U_n$ representing a set of user equipment u belonging to the intent n in the wireless network, $$a_1^n, a_2^n, \ldots, a_s^n$$

representing a preset weight of the intent n to a performance metric 1, 2, . . . , s, $r_{V_{s,n}}(t)$ representing a corresponding network resource vector allocated to the intent n for the performance metric s, and $$R_1^{max}, R_2^{max}, \ldots, R_s^{max}$$

representing a maximum theoretical performance value of the performance metric 1, 2, . . . , s in the wireless network, the higher the value of $R_s(\cdot)$, the lower the performance metric s, corresponding $R_s(\cdot)$ and $$R_s^{max}$$

in the formula taking reciprocal forms.

4. The resolution method for intent-based wireless network resource conflicts according to claim 1, wherein step 2 specifically comprises:

S201: comparing the acted network area range and the executed lifecycle by the pre-allocation policy required for the newly-added intent with the corresponding data information of the network configuration policy being executed in the network, and determining whether the overlapped acted network area range and/or the overlapped executed time period occur, step S202 being executed if so and step 3 being executed if not;

S202: determining whether the pre-allocation policy of the newly-added intent will result in an intent satisfaction degree in the network being equal to/lower than a satisfaction degree threshold value, step 203 being executed if so and step 3 being executed if not;

S203: canceling a pre-allocation policy estimated to cause multidimensional resource conflicts, and redeploying the network resources according to the stored historical intent requirement information and the distribution of resources in the wireless network;

S2041: establishing a multi-intent Stackelberg game model to perform intent-level coarse-grained network resource deployment according to an intent priority difference and a behavior of network resource competition in the wireless network;

S2042: dynamically adjusting network resources allocated to each user under the intent according to a bias difference of the user to different performance metrics under the intent, and performing user-level fine-grained network resources deployment; and S2043: determining whether a redeployment policy of the network resources results in the intent satisfaction degree in the network being equal to/lower than the satisfaction degree threshold value, step S2041 being executed if not and step 3 being executed if so.

5. The resolution method for intent-based wireless network resource conflicts according to claim 4, wherein in step S2041, the intent-level coarse-grained network resource deployment is modeled using the Stackelberg game model, three basic elements are defined: a participant set, a policy set of a participant and a utility set of the participant, and an expression of a game problem G is as follows:

$$G = [N, (X_i)_{i \in N}, (U_i)_{i \in N}], \quad (4)$$

$N=\{1, 2, \ldots, n\}$ representing a participant set in the game problem, namely, a set of intents to participate in resource competition, X representing a policy set of a participant, namely, a policy set for acquiring network resources for the intents to participate in resource competition, and U representing a utility function of the participant, a metric being configured to measure benefits gained from the intents to participate in the game;

an expression of a utility function for a follower low priority intent participating in the game is as follows:

$$U_n\left(r_{V_{s,n}}(t)\right) = F_n\left[r_{V_{s,n}}(t), R_s(\cdot), a_s^n\right] - \sum_{s \in S}\sum_{u \in U_n} p_{V_s}^{N_l} r_{V_{s,u}}(t), \quad (5)$$

$$n \in N_l,$$

an expression of a utility function for a leader high priority intent participating in the game is as follows:

$$U_n\left(r_{V_{s,n}}(t)\right) = F_n\left[r_{V_{s,n}}(t), R_s(\cdot), a_s^n\right] - \sum_{s \in S}\sum_{u \in U_n} p_{V_s}^{N_h} r_{V_{s,u}}(t), \quad (6)$$

$$n \in N_h,$$

$U_n$ representing a set of user equipment u belonging to an intent n in the wireless network, $F_n[\cdot]$ representing a multidimensional performance function of a certain intent n, $r_{V_{s,n}}(t)$ representing a corresponding network resource vector allocated to the intent n for a performance metric s, $R_s(\bullet)$ representing a specific performance numerical function corresponding to the performance metric s, $$a_s^n$$

representing a preset weight of the intent n to the performance metric s, S being an intent performance metric set, $p_{V_s}$ representing unit pricing factors for resources Vs belonging to different dimensions, $$p_{V_s}^{N_h} \text{ and } p_{V_s}^{N_l}$$

representing unit resource prices of a high priority intent and a low priority intent, $N_l$ representing a set of high priority network intents, and $N_h$ representing a set of low priority network intents;

expressions of coarse-grained resource allocation problems for the leader and follower are as follows:

$$\max U_n\left(r_{V_{s,u}}(t)\right), n \in N_h \text{ or } N_l \tag{7}$$

$$C1: \sum_{s \in S}\sum_{u \in U_n} r_{V_{s,u}}(t) \le V_S$$

$$C2: \sum_{u \in U_n} r_{V_{s,u}}(t) \le r_{V_{s,u}}(t)$$

subject to: $C3: R_s\left(r_{V_{s,u}}(t)\right) \ge R_{s,u}^{thr} \text{ or } R_s\left(r_{V_{s,u}}(t)\right) \le R_{s,u}^{thr}, s \in T$ $$C4: a_s^n \in [0, 1)$$

$$C5: \Sigma_{s \in S}\ a_s^n = 1,$$

a constraint condition C1 representing a constraint on the number of network resources provided by the network, $V_s$ representing corresponding multidimensional network resources available for deployment for the performance metric s, a constraint condition C2 representing a constraint on the number of network resources allocated to each user, a constraint condition C3 representing that a threshold value performance metric must be greater than a preset threshold value, $$R_{s,u}^{thr}$$

representing a corresponding minimum threshold value of the user u for the performance metric s, T being a threshold value performance metric set, a constraint condition C4 representing a weight of the performance metric, and a constraint condition C5 representing that a sum of weights of the performance metrics is limited; and an expression of an optimal solution of coarse-grained resource allocation based on Stackelberg game equilibrium is as follows:

$$U_n r_{V_{s,u}}^*(t) \ge U_n r_{V_{s,u}}(t) \forall\ r_{V_{s,u}}(t), n \in N_h \text{ or } N_l, \tag{8}$$

$r^*_{V_{s,u}}(t)$ representing an optimal coarse-grained resource allocation policy of the wireless network to the intent n.

6. The resolution method for intent-based wireless network resource conflicts according to claim 4, wherein in step S2042, a user-level fine-grained network resource deployment problem is described as a multi-objective optimization problem with O+T optimization objectives, and an expression is as follows:

$$\max_{u \in U_n, r_{V_{s,n}}(t)} \left[ \begin{array}{c} R_1\left(r_{V_1,u}(t)\right), R_2\left(r_{V_2,u}(t)\right), \dots, R_T\left(r_{V_T,u}(t)\right), \\ R_{1+T}\left(r_{V_{1+T},u}(t)\right), R_{2+T}\left(r_{V_{2+T},u}(t)\right), \dots, R_{O+T}\left(r_{V_{O+T},u}(t)\right) \end{array} \right] \tag{9}$$

$$\text{subject to:}\quad \begin{array}{c} C1, C2: \sum_{u \in U_n} r_{V_{s,u}}(t) \le r_{V_{s,u}}(t) \\ C3: R_s\left(r_{V_{s,u}}(t)\right) \ge R_s^{thr} \text{ or } R_s\left(r_{V_{s,u}}(t)\right) \le R_s^{thr}, s \in T \end{array},$$

$U_n$ representing a set of user equipment u belonging to an intent n in the wireless network, $r_{V_{s,n}}(t)$ representing a corresponding network resource vector allocated to the intent n for a performance metric s, $R_1(\bullet)$, $R_2(\bullet)$, ..., $R_{O+T}(\bullet)$ representing a specific performance numerical function corresponding to a performance metric 1, 2, ..., O+T, $R_s(\bullet)$ representing a specific performance numerical function corresponding to the performance metric s, $$R_s^{thr}$$

representing a corresponding minimum threshold value of the performance metric s, O being an optimized performance metric set, T being a threshold value performance metric set, S being an intent performance metric set, O+T=S, a constraint condition C2 representing a constraint on the number of network resources allocated to each user, and a constraint condition C3 representing that a threshold value performance metric must be greater than a preset threshold value.

7. The resolution method for intent-based wireless network resource conflicts according to claim 6, wherein the multi-objective optimization problem is solved by a low complexity solution based on a weighted sum, and the multi-objective optimization problem is converted into:

$$\max_{u \in U_n, r_{V_{s,n}}(t)} \sum_{s \in O \cup T} a_s^n R_s\left(r_{V_{s,u}}(t)\right) \tag{10}$$

$$C1 \sim C3;$$

$$\text{subject to:}\quad C4: a_s^n \in [0, 1),$$

$$C5: \sum_{s \in S} a_s^n = 1$$

$$a_s^n$$

representing a preset weight of an intent n to a performance metric s, a constraint condition C4 representing a weight of the performance metric, and a constraint condition C5 representing that a sum of weights of the performance metrics is limited.

\* \* \* \* \*